Figure 1:
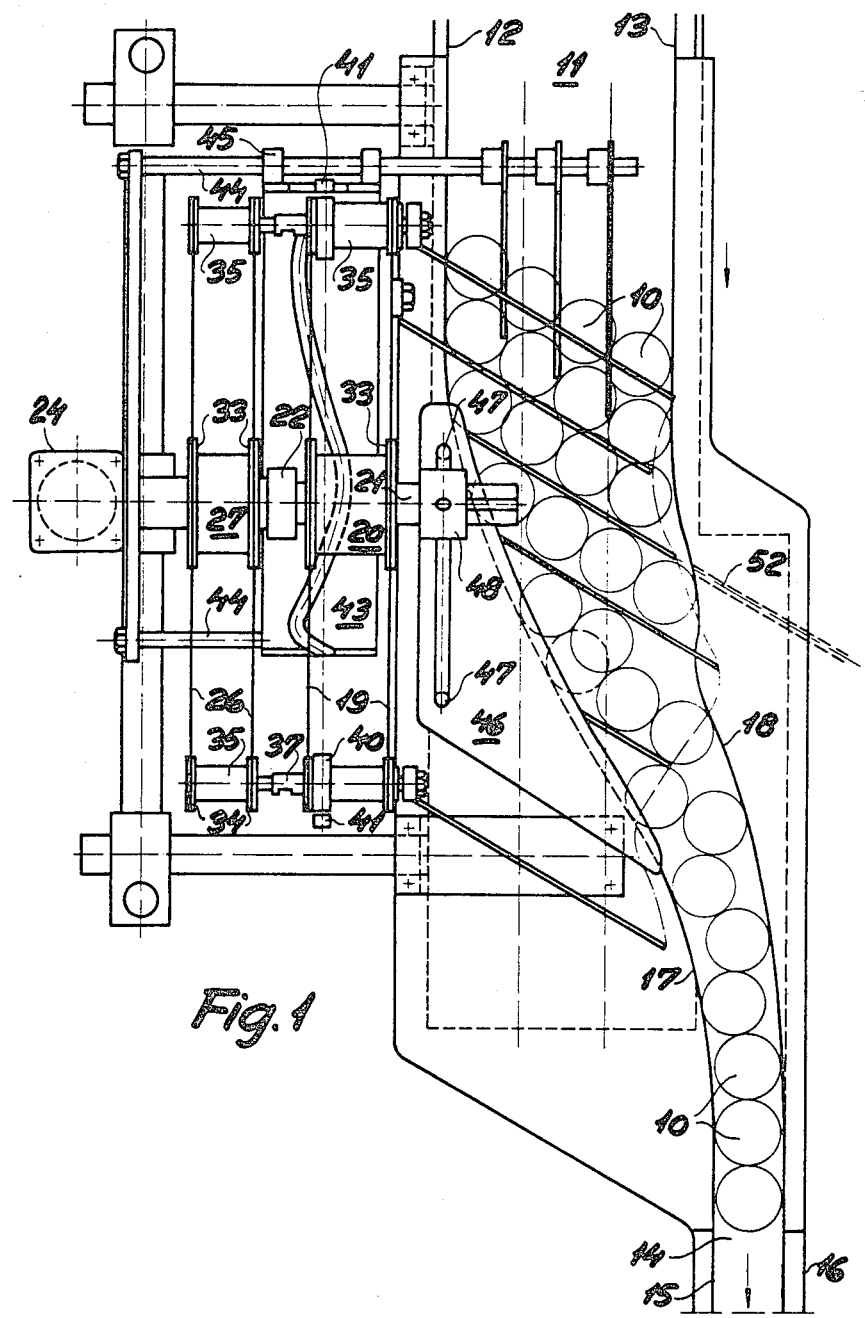

United States Patent [19]

Mernøe

[11] Patent Number: 4,544,059
[45] Date of Patent: Oct. 1, 1985

[54] APPARATUS FOR COMBINING SEVERAL ROWS OF BOTTLES OR SIMILAR OBJECTS ON AN INLET CONVEYOR TO A SINGLE ROW ON AN OUTLET CONVEYOR

[75] Inventor: Erik C. Mernøe, Virum, Denmark
[73] Assignee: De Forenede Bryggerier A/S, Copenhagen, Denmark
[21] Appl. No.: 468,051
[22] PCT Filed: Jul. 1, 1982
[86] PCT No.: PCT/DK82/00061
    § 371 Date: Feb. 16, 1983
    § 102(e) Date: Feb. 16, 1983
[87] PCT Pub. No.: WO83/00135
    PCT Pub. Date: Jan. 20, 1983

[30] Foreign Application Priority Data

Jul. 3, 1981 [DK] Denmark .............................. 2963/81

[51] Int. Cl.⁴ .............................................. B65G 47/26
[52] U.S. Cl. .................................. 198/453; 198/478; 198/474.1
[58] Field of Search ............... 198/448, 449, 447, 450, 198/453, 451, 452, 456, 457, 459, 461, 425, 478

[56] References Cited

U.S. PATENT DOCUMENTS

| | | | |
|---|---|---|---|
| 2,805,755 | 9/1957 | Jones .............................. | 198/425 |
| 2,941,650 | 6/1960 | Clinton ............................ | 198/425 |
| 3,107,775 | 10/1963 | Dardaine et al. ............... | 198/425 |
| 3,237,759 | 3/1966 | Solski et al. .................... | 198/479 |
| 4,041,677 | 8/1977 | Reid ................................ | 198/425 |
| 4,205,744 | 6/1980 | Timmons et al. ............... | 198/478 |
| 4,231,463 | 11/1980 | Vamvakas ....................... | 198/450 |

FOREIGN PATENT DOCUMENTS 6506394 11/1966 Netherlands ..................... 198/448

Primary Examiner—Joseph E. Valenza
Assistant Examiner—Kyle E. Shane
Attorney, Agent, or Firm—Ladas & Parry

[57] ABSTRACT

A bottle single filer for combining bottles (10) fed in a plurality of rows on an inlet conveyor (11) to a single row on an outlet conveyor (14), has a plurality of oblong separators (38), which are controlled so as to be movable through a closed path in which they extend obliquely across the inlet conveyor in parallel with the transverse rows of bottles on it. At a specific location in this path the individual separator moves down between two bottle rows which it follows until the bottles contact and slide along a barrier (17), which is formed by a transfer section of one side rail and forms a smaller angle with the transport direction than the separators, the bottles being pushed on to the outlet conveyor along said barrier. In connection with the side rails the separators ensure that only one row of bottles at a time can pass, to thereby obviate bridge formation and jamming. This also reduces the risk of bottle collision and thus the noise level.

13 Claims, 6 Drawing Figures

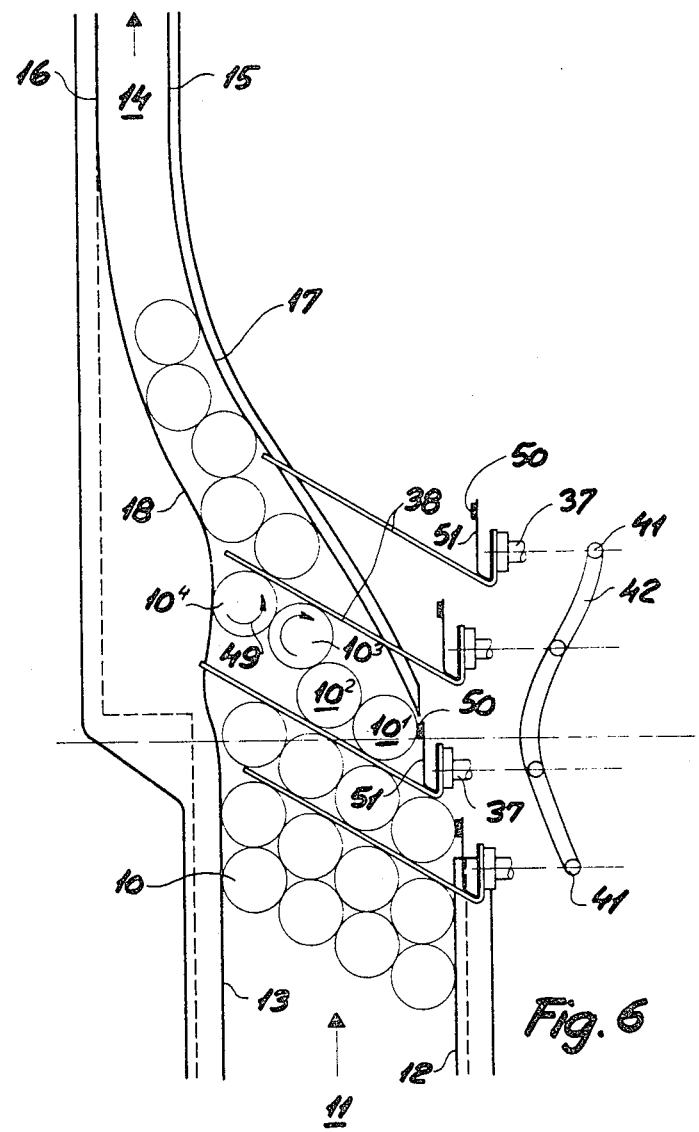

APPARATUS FOR COMBINING SEVERAL ROWS OF BOTTLES OR SIMILAR OBJECTS ON AN INLET CONVEYOR TO A SINGLE ROW ON AN OUTLET CONVEYOR

The invention relates to an apparatus for combining bottles or similar objects fed on an inlet conveyor, on which they form inclined rows into a single row on an outlet conveyor. Such so-called bottle single filers are used e.g. in breweries in front of the machinery in a bottling line which requires single file inlet, such as filler crowners, labelling machines and inspecting machines.

Generally, single filing of a wide stream of bottles takes place gradually through the aid of converging rails simultaneously with the bottles being transferred to conveyors of greater speed. In such conventional bottle single filers blocking or bridge formations are frequent. As the mutual coefficient of friction ($\mu$) bottle to bottle of cleaned and wet return bottles is particularly great ($\mu > 0.8$), blockings occur especially often in return bottle plants, even if a very small single filing angle is used.

When transported in several rows on traditional conveyors, the bottles tend to occupy as little space as possible, corresponding to a so-called triangulation pattern in which the central points of adjoining bottles, projected on a horizontal plane, form corners in equilateral triangles. It can be shown that the condition to be met to bring objects of a circular cross-section out of triangulation by rail reaction alone is that $\mu < 1/\text{tg}60 = 0.577$.

In traditional return bottle single filers, mechanical aids, such as horizontally working vibrators and excentric-controlled rail movements are therefore used or measures are taken in order to reduce the risk of blocking.

The drawbacks of the traditional bottle single filer increase with increasing capacity and include 1. poor operational reliability,
2. high level of noise, which even when acoustically attenuated exceeds 90 dB(A),
3. generation of wear rings on the bottles because of wedge effect, and
4. great space requirement in the longitudinal direction.

The object of the invention is to provide an apparatus of the present type which can single file bottles on a short transport stretch without any risk of blocking and without using vibrators or other means to move the rails.

This object is achieved by constructing the apparatus so that it has a plurality of oblong separators mounted and controlled so as to extend across the inlet conveyor substantially in parallel with the rows of bottles and to move in a closed path in which, from above, they move down between two rows of bottles and follow them during the last part of their movement on the inlet conveyor towards an inclined guide rail which forms a smaller angle with the inlet conveyor than the separators and transfers the bottles to the outlet conveyor. In this construction the separators, which are moved in between the inclined rows of bottles, serve to control the individual bottles, to thereby prevent the above-mentioned bridge formation of the bottles on the conveyor. It has been found that such a bottle single filer, even with a great capacity, improves the operational reliability significantly.

Even though empty spaces should occur in the triangulation pattern, this will not produce blocking. Likewise, normally occurring out of round portions or other minor deviations usually do not cause interruptions in the operation.

The circumstance that the bottles are separated by the separators, which can expediently be made of a plate of steel coated with plastics as stated in claim 4, partly reduces the noise level in the single filing area significantly, partly eliminates overloading of the bottles which in traditional single filers takes place by wedge effect combined with mechanical aids.

It has moreover been found that the length required to incorporate an embodiment of the stated single filer to combine five rows of beer bottles to a single row, can be reduced to approximately 1 m, while a corresponding traditional single filer requires a length of 3 to 5 m.

When the path of movement of the separators is circular, a particularly simple construction can be obtained. An embodiment of such a construction is characterized in that each separator is secured in a separator shaft which is rotatably journalled in a control disc, which itself is rotatably journalled and disposed in a vertical plane parallel to the travelling direction of the inlet conveyor, that the separator shafts are equidistantly spaced along a circle on the control disc, and that said separator shafts, through connecting springs of equal length, are connected to their respective shafts on an auxiliary disc rotatable about an axis which is parallel with and offset from the axis of the control disc so that the separators move translatorily during the rotation of the discs. This embodiment also causes the movement of the separators to be translatory so that separators, such as those defined in claims 4 and 5, remain in a vertical orientation during all phases of their movement.

In the apparatus of the invention, the separator disc may be motor-driven, but it may also be driven solely by the pressure of bottles arriving on the inlet conveyor. In both cases, the separators should during the portion of their path of movement in which they contact bottles desirably have a substantially constant, horizontal speed component in the conveyor direction corresponding to the normal speed of the bottles in the triangulation pattern, the rotary speed of the separator disc being kept substantially constant. Since the separators form an angle with their shafts, provision is made for a compensating control of the speed component of the separators in the transport direction by constructing the apparatus so that the separators are mounted and controlled such that they can move a limited distance transversely to the inlet conveyor. One practically expedient embodiment of means for maintaining a constant, horizontal speed component of the separators during a part of their movement is characterized in that each separator is connected to a curve roller so that the two members are immovable with respect to each other in the axial direction of the control disc, a circular or arc-shaped guide track or cam being provided to cooperate with the curve roller.

In such a construction the desired constant, horizontal speed component of the separators during a part of their movement can be obtained by shaping the guide track or cam with consideration of the contour of the bottles. Particularly the apparatus may be so arranged that the portion of the guide track which corresponds to the inlet conveyor stretch where the row of bottles is transferred to the outlet conveyor, guides the separators axially inwards toward the control disc.

An expedient embodiment of transfer sections between the side rails on the two conveyors is one in which the two sections are formed so that the bottles are gradually accelerated during the transfer and that the distance between the sections after the separation is smaller than the double bottle diameter.

When the apparatus is suspended from or supported by a lifting cylinder, the whole apparatus can be lifted free so that it can be pivoted sideways and is thus readily accessible for inspection and repair.

In an embodiment of the apparatus a spring means is secured at the inner end of each separator, said spring means being arranged and mounted so as to laterally support the bottle rows on a stretch of the transfer area where the transfer section is removed. Such aconstruction is instrumental in ensuring a smooth and regular transferring process.

Figure 2:
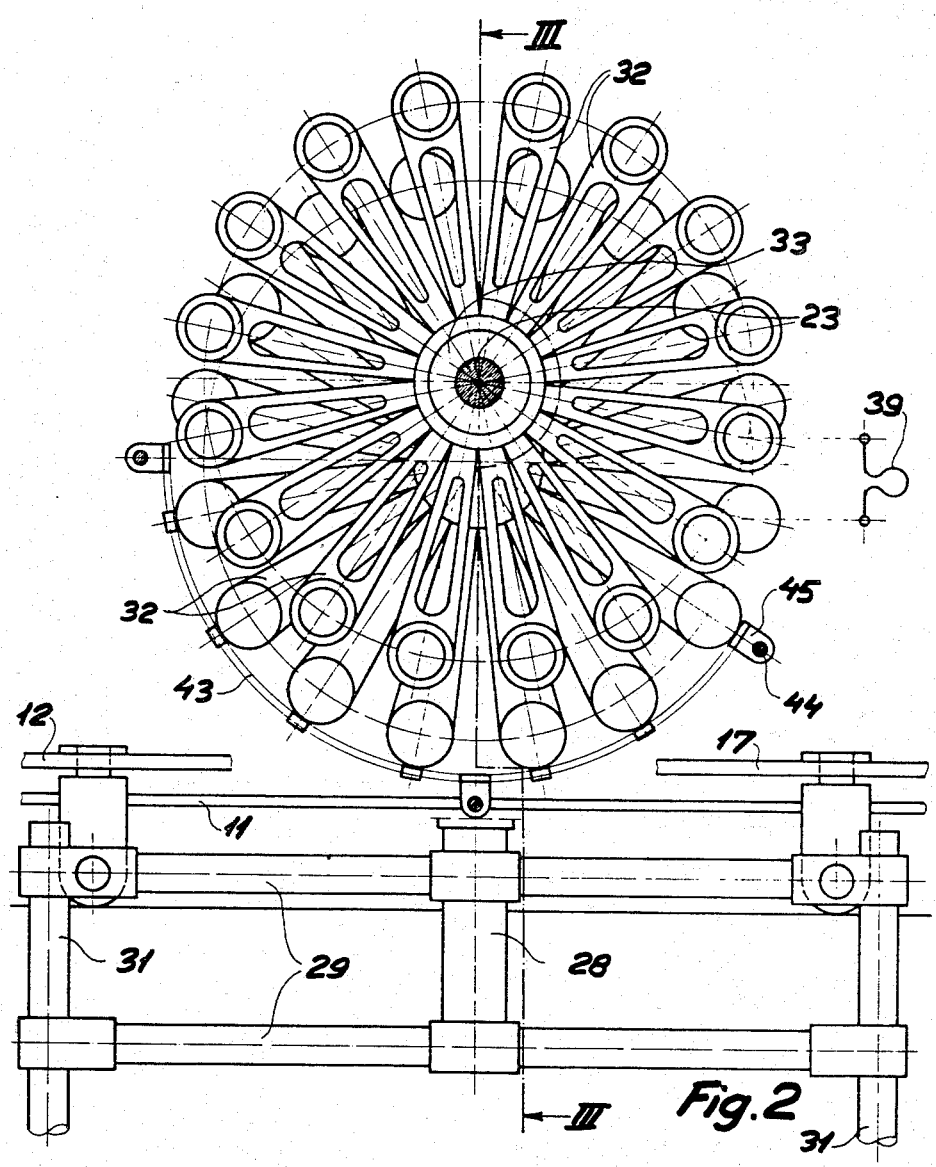
Figure 3:
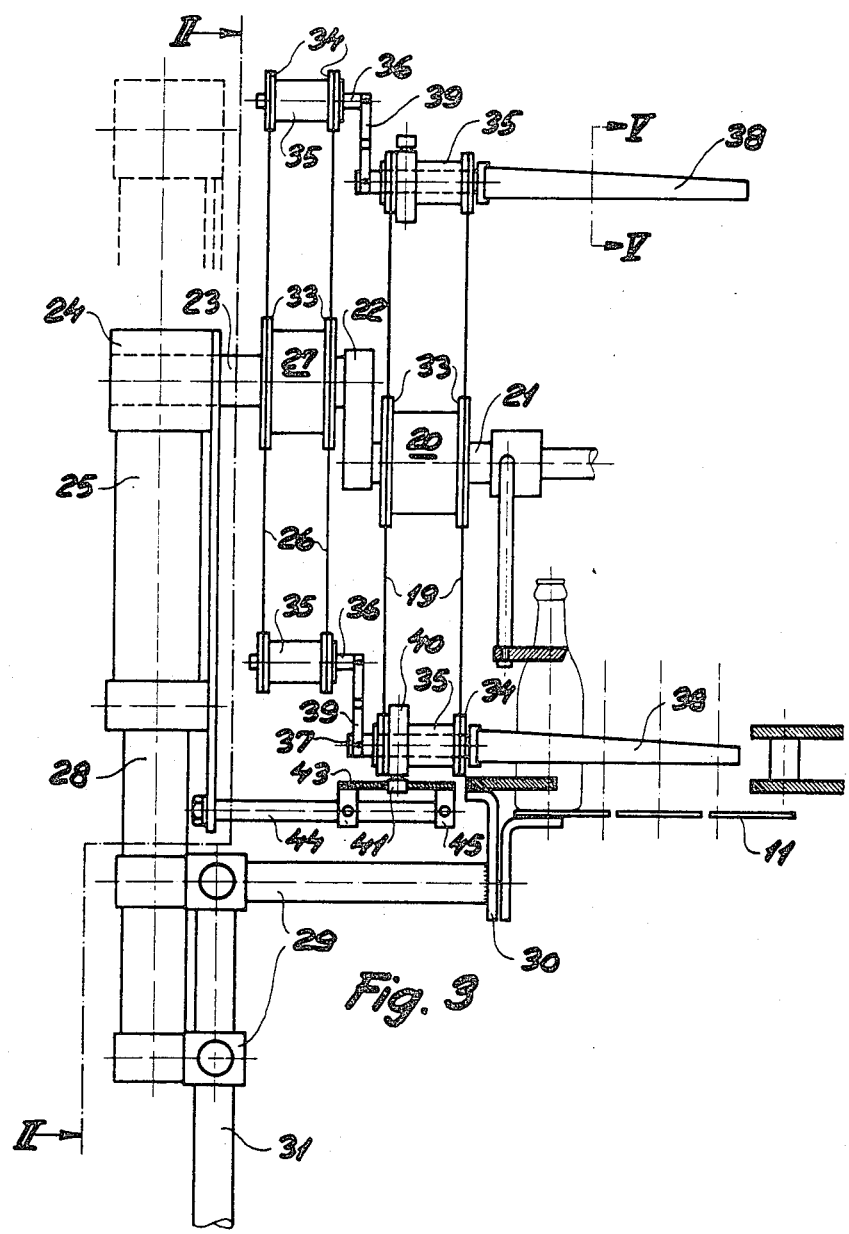
Figure 4:
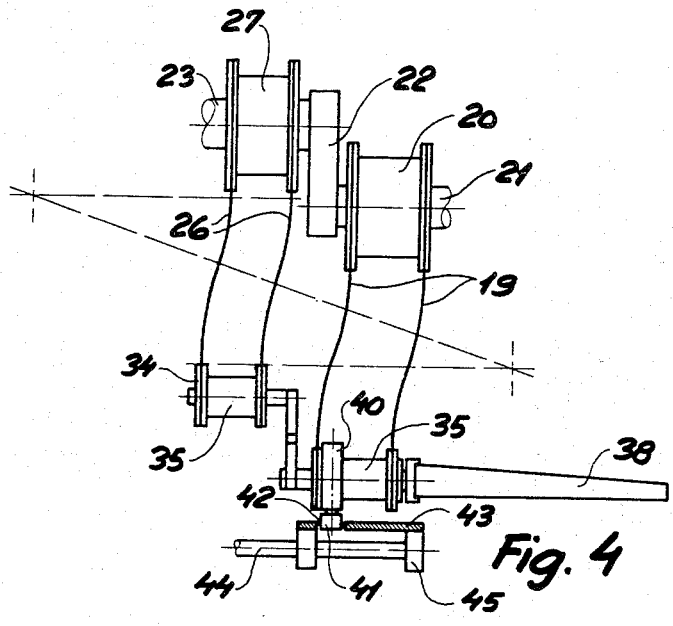
Figure 5:

The invention will be explained more fully below with reference to the drawing, in which FIG. 1 is a top view of an embodiment of the apparatus of the invention, FIG. 2 is a section taken along the line II—II in FIG. 3, illustrating the two discs with the separator devices removed, and a part of the inlet conveyor and a support frame seen in a direction perpendicular to the conveyor, FIG. 3 is a section taken along the line III—III in FIG. 2 with two separator devices shown in a neutral axial position, FIG. 4 is a vertical fragmentary view corresponding to a part of FIG. 3, but shows the separator displaced axially inwards, FIG. 5 is an enlarged section taken along the line V—V in FIG. 3, and FIG. 6 is a horizontal view corresponding to a part of FIG. 1, but shows a modified embodiment of the apparatus.

The embodiment shown in the drawing is adapted to combine beer bottles 10, which are advanced in the direction indicated by an arrow x, into four rows in a triangulation pattern on an inlet conveyor 11. In this pattern of densely crowded bottles each transverse row of bottles forms an angle of 60° with the travelling direction of the conveyor and its side rails 12 and 13 having an internal spacing of $d(1+(z-1)\cos 30)$, where d is the diameter of the bottle and z the number of bottles in a transverse row of bottles. In the embodiment shown z=4.

Beside the outlet end of the inlet conveyor 11 and at the same level is mounted an outlet conveyor 14 which travels in the same direction x as the inlet conveyor, but at a speed four times as great, and this outlet conveyor only accomodates a single row of bottles. The side rails 15 and 16 of the outlet conveyor are connected to the rails 12 and 13, respectively, through specially designed rail sections, viz. a transfer section 17 and a back support section 18, respectively.

Beside and spaced above the inlet conveyor 11 is a pair of control discs 19 having a common central hub 20 rotatably journalled on a crank 21 in a vertical plane in parallel with the transport direction. The crank 21 is carried by a crank arm 22, which in turn is secured to one end of a shaft 23 which is parallel with the crank, the other end of the shaft being clamped in a clamping member 24 on the upper portion of a lifting cylinder 25. A pair of auxiliary discs 26 having a central hub 27 is rotatably journalled on the shaft 23.

The lifting cylinder 25 has a downwardly directed piston rod 28, whose lower end portion is secured (not shown in details) to a frame 29, which itself is secured to the conveyor rail 30, and have height adjustable supporting legs 31, in such a way as to permit adjustment of the lifting cylinder in three dimensions.

The control discs 19 and the auxiliary discs 26 are identical, and each of these discs is shaped as a star wheel comprising a plurality, sixteen in the shown embodiment, of radial, equiangularly spaced fingers 32, which are punched from stainless spring steel and whose inner ends are clamped between clamping discs 33 at the ends of the hubs 20 and 27. An outer hub 35 is fixed between the outer ends of each pair of oppositely disposed fingers 32 by means of clamping discs 34.

A control shaft 36 is rotatably journalled in each auxiliary disc outer hub 35, and each control disc outer hub rotatably mounts a carrier shaft 37 for a bottle separator 38 which is secured to the outer end of the shaft 37 and is composed of an oblong steel plate coated with plastics. Said steel plate is disposed in a vertical plane and extends across the inlet conveyor 11 in a direction parallel with the rows of bottles, i.e. at an angle of 60° with the conveyor. As shown in FIG. 5, the lower edge of the separators has a bevelled rear edge.

A connection spring 39, which in FIG. 2 is moved slightly away from the discs for clarity, is fixed between each control shaft 36 in the auxiliary disc 26 and a corresponding separator carrier shaft 37 in the control disc 19. The connecting spring 39 is a flat spring of a substantially Ω-shaped cross-section which permits compensation for minor variations in the shaft distance.

The control disc pair 19 is located at such a level with respect to the conveyor 11 as will cause the separators 38 at the lower portion of the disc to be disposed between and to separate adjacent rows of bottles, and these separators will therefore be urged forwards by the pressure of bottles arriving on the conveyor so that the control disc 19 will be rotated by the bottle pressure. The auxiliary disc 26 and its connections with the separator shafts 37 through the flat springs 39 cause the separators 38 to move translatorily during the rotation of the control disc 19 and to remain in vertical planes and at the same angle of 60° with the conveyor 11 during all phases of their movements.

Each individual bottle separator and associated control disc hub 35, connecting spring 39 and auxiliary disc hub 35 form a unit which can be axially displaced because of the spring characteristics of the fingers 32. Each control disc hub 35 has secured to it a bracket 40 which extends radially with respect to the control disc and carries a curve roller 41 at its outer end. This curve roller runs in a guide track 42 in an arc-shaped curve guide 43, which extends along a lower portion of the periphery of the control disc pair 19 and is secured to the supporting structure by means of carrier rods 44 and brackets 45. In the embodiment shown, the curve guide 43 covers only the active portion of the path movement of the separators, but can if desired enclose the control discs completely.

On that portion of the closed path of movement of a bottle separator in which it is in contact with bottles, its axial position with respect to the control disc pair 19 is determined by the shape of the guide track 42. This shape is adapted with consideration of the shape of the bottles so that the horizontal component in the travelling direction of the conveyor of the separator speed, which is the resultant of the regularly rotary movement of the separator together with the control disc pair and its axial movement with respect to the control disc pair, is substantially constant and equal to the regular feeding rate of the bottle stream on the inlet conveyor 11.

The barrier formed by the transfer section 17 is arranged so that the bottles in each row are pressed towards the outlet conveyor at a gradually increasing speed.

Overturning of the bottles is prevented by an overhead back support plate 46, which in the entire length of the transfer section provides a support for the bottle neck of the innermost bottle in the row. The plate 46 is adjustable in height by being suspended from two fork prongs 47 which are connected to a sleeve 48 fixed to the end of the crank 21 so as to be adjustable in the transverse direction of the conveyor.

To provide for correct protrusion of the separators between the rows of bottles, there has to be a certain minimum spacing between the separators, which puts a lower limit to the diameters of the control discs 19 and the auxiliary discs 26.

During the transfer operation the separators 38 in connection with the shape of the back support rail 18 and the distance to the transfer section 17 ensure than only one bottle row at a time can be transferred to the outlet conveyor 14 so no jamming will occur. Moreover, the separators prevent collision between the bottles during the single row transfer, and thus prevent both bottle noise and bottle wear.

The projection of the curve of the separator movement path is shown by a dashed line in FIG. 1.

The acceleration imparted to the bottles along the transfer section 17 depends upon the angle between the separators 38 and the transfer section, but also upon the speed components of the separators in the conveyor direction of the conveyor as well as in the transverse direction.

The guide track 42 is shaped so that a bottle row under transfer gets a component in the direction x as great as possible and a relatively small component in the direction of the separators.

The axial travel of the separators during the transfer motion causes the spacing between the separators to widen, whereby the bottle row may be broken, as shown in FIG. 6, where the bottles in the row in question are designated by $10^1$, $10^2$, $10^3$ and $10^4$. The frictional contact with the back support section 18 causes the outermost bottle $10^4$ to rotate in the direction shown by an arrow 49 and the adjacent bottle $10^3$ to rotate in the opposite direction. When at the location in question the innermost bottle $10^1$ contacts the transfer section 17, the second innermost bottle $10^2$ will be caused to rotate counterclockwise, i.e. in the opposite direction of its adjacent bottle $10^3$. This may entail that the bottle $10^2$ leaves the row and gets in front of the bottle $10^3$. This is avoided by the embodiment of FIG. 6 in which a portion of the transfer section 17 is removed at the stretch in question and the innermost bottle $10^1$ is laterally supported by a plastics tab 50, which is fitted at the end of substantially hairpin-shaped flat spring secured to the inner portion of the separator 38. The advantage of this construction is that the spring 51 applies an even, yieldable pressure to the bottle row and thus compensates for variations in the bottle diameter, and that the rotation imparted to the outermost bottle $10^3$ by the outer bottle $10^4$ being urged against the back support section 18 will cause the adjacent bottle $10^3$ to move so as to get in front of the inner adjacent bottle $10^2$ as shown, to promote a smooth and regular transfer process. Also, the noise level is significantly reduced.

The details of the separator mechanism shown and described in the foregoing can be modified in many ways. For example, the path of movement of the separator shafts does not have to be circular as these shafts can be supported by a chain or by two chains running in parallel. Nor do the control discs have to be disposed in a plane parallel with the transport direction, but may e.g. form an angle with the inlet conveyor.

Instead of being parallel with the inlet conveyor 11, the outlet conveyor 14 may form an angle with it, e.g. corresponding to the barrier direction.

Also the number of separators may be varied. The most favourable number depends e.g. on the form of the bottles. It can be shown that the optimum number of separators for treatment of standard beer bottles is sixteen.

The curve guide 43 may be divided into two sections, the first of which corresponding to a specific bottle shape is replaceable, while the second corresponding to the transfer motion described is fixed.

Moreover, automatic control mechanisms may be provided to facilitate the start of the apparatus. In FIG. 1, the dotted lines illustrate a manually operable bottle barrier 52 which upon start is pushed over the inlet conveyor 11 to block it. The lifting cylinder 25 is lifted and the inlet conveyor is started by this operation. In the lifted position the apparatus can be pivoted about the axis of the lifting cylinder and thus be made readily accessible for adjustments and the like. When the bottle barrier 52 is withdrawn, the inlet conveyor 11 stops and the lifting cylinder is lowered, while the rotary plane is automatically positioned in a plane which is parallel with the transport direction. Furthermore, the angle of rotation of the control discs can be positioned to ensure that the separators will correctly engage the compact triangulation pattern when the apparatus is lowered.

The constructional details of the structures shown and described can be modified in other ways too. The apparatus can also perform operations being the reverse of single filing as it can distribute bottles arriving in a single file into several, more slowly moving files.

I claim:

1. An apparatus for combining bottles or similar objects fed on an inlet conveyor on which they form inclined rows, into a single row on an outlet conveyor operating at a speed substantially equal to the number of objects in each row times the speed of the inlet conveyor, in which the improvement comprises: a plurality of oblong separators mounted and controlled so as to extend across the inlet conveyor substantially in parallel with the rows of bottles and to move in a closed path and means for causing the separators to move so that on at least a part of the path the separators have a velocity having a main component parallel to the inlet conveyor and a relatively small component perpendicular thereto, and in which path, the separators, from above, move down between each two adjacent rows of bottles and follow them during the last part of their movement on the inlet conveyor towards an inclined guide rail which forms a smaller angle with the inlet conveyor than the separators and transfers the bottles to the outlet conveyor.

2. An apparatus according to claim 1, in which the path of movement of the separators is circular.

3. An apparatus according to claim 2, in that each separator is secured in a separator shaft which is rotatably journalled in a control disc, which itself is rotatably journalled and disposed in a vertical plane parallel to the travelling direction of the inlet conveyor, the separator shafts being equidistantly spaced along a circle on the control disc, and said separator shafts, through connecting springs of equal length, being connected to their respective shafts on an auxiliary disc rotatable about an axis which is parallel to and offset from the axis of the control disc so that the separators move translatorily during the rotation of the discs.

4. An apparatus according to claim 3, in which each separator is formed by an oblong steel plate which is preferably coated with plastics.

5. An apparatus according to claim 4, in which the downwardly directed edge portion of the separator plate has a bevelled rear edge.

6. An apparatus according to claim 1 including means for mounting and controlling the separators so that they can move a limited distance transversely to the inlet conveyor.

7. An apparatus according to claim 6, in which each separator is connected to a curve roller so that the two members are immovable with respect to each other in the axial direction of the control disc, a circular or arc-shaped guide track or cam being provided to cooperate with the curve roller.

8. An apparatus according to claim 7, in which the guide track or cam is arranged in consideration of the contour of the bottles so that the separators have a substantially constant, horizontal speed component at least during the first part of their path of movement in which they contact bottles.

9. An apparatus according to claim 8, in which the portion of the guide track which corresponds to the inlet conveyor stretch where the row of bottles is transferred to the outlet conveyor, guides the separators axially inwards toward the control disc.

10. An apparatus according to claim 7, wherein side rails on the inlet conveyor are connected to side rails on the outlet conveyor through transfer and back support sections, the first one of which forms said guide rail, and in which the two sections are formed so that the bottles are gradually accelerated during the transfer and so that the distance between the sections after separation is smaller than the double the bottle diameter.

11. An apparatus according to claim 1, further comprising a lifting cylinder for adjusting the height of the separators above the inlet conveyor.

12. An apparatus according to claim 10, in which a spring means is secured at the inner end of each separator, said spring means being arranged and mounted so as to laterally support the bottle rows on a stretch of the transfer area where the transfer section is removed.

13. An apparatus for combining bottles or similar objects fed on an inlet conveyor on which they form inclined rows, into a single row on an outlet conveyor, comprising a plurality of oblong separators mounted and controlled so as to extend across the inlet conveyor substantially in parallel with the rows of bottles and to move in a closed, circular path in which, from above, they move down between two rows of bottles and follow them during the last part of their movement on the inlet conveyor towards an inclined guide rail which forms a smaller angle with the inlet conveyor than the separators and transfers the bottles to the outlet conveyor, each separator being secured in a separator shaft which is rotatably journalled in a control disc, which itself is rotatably journalled and disposed in a vertical plane paralled to the travelling direction of the inlet conveyor, the separator shafts being equidistantly spaced along a circle on the control disc, and the separator shafts, through connecting springs of equal length, being connected to their respective shafts on a auxiliary disc rotatable about an axis which is parallel to and offset from the axis of the control disc so that the separators move translatorily during the rotation of the discs, each separator being connected to a curve roller so that the two members are immovable with respect to each other in the axial direction of the control disc, a circular or arc-shaped guide track or cam being provided to cooperate with the curve roller.

* * * * *